(No Model.) 2 Sheets—Sheet 2.
H. F. GASKILL.
CUT-OFF VALVE GEAR.
No. 391,040. Patented Oct. 16, 1888.
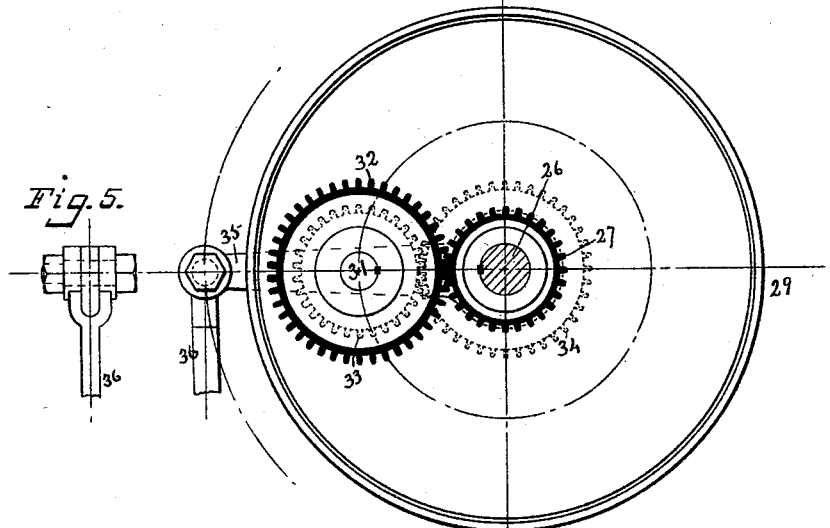
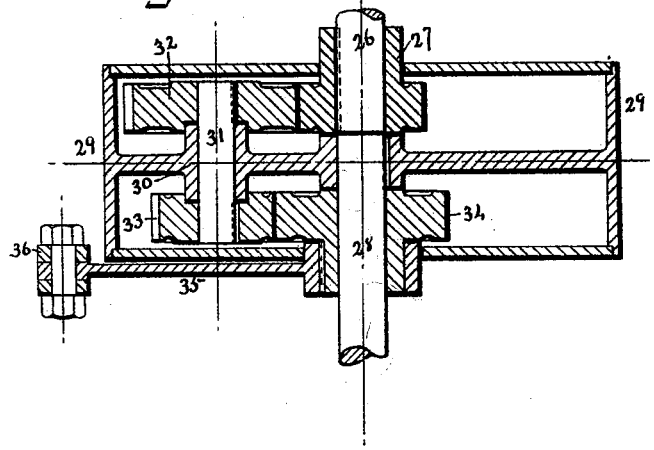

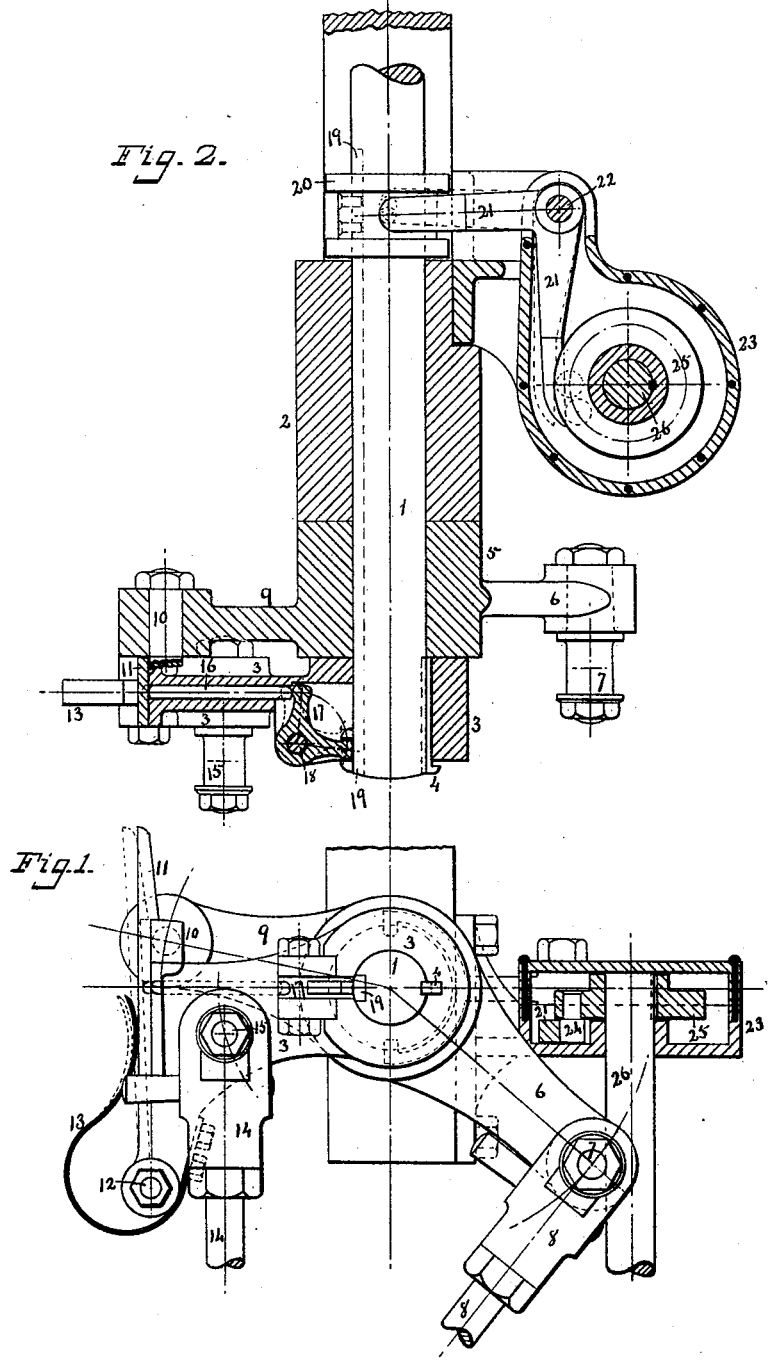

UNITED STATES PATENT OFFICE.

HARVEY F. GASKILL, OF LOCKPORT, NEW YORK.

CUT-OFF-VALVE GEAR.

SPECIFICATION forming part of Letters Patent No. 391,040, dated October 16, 1888.

Application filed June 4, 1888. Serial No. 275,930. (No model.)

*To all whom it may concern:*

Be it known that I, HARVEY F. GASKILL, of Lockport, New York, have invented certain new and useful Improvements in Cut-Off-Valve Gears, of which the following is a specification.

The object of this invention is to provide a simple and reliable apparatus for actuating the valves of an engine, which will automatically cut off or close the valve at any desired point of the stroke, and also give a long range of cut-off, varying from nothing to full-stroke.

To these ends the invention consists in the devices or combinations recited in the claims at the end hereof.

The invention is more particularly applicable to engines of the Corliss type.

In the drawings I have shown the mechanism applied to the admission-valve of a steam-engine and containing my invention in the best form in which I have as yet embodied it.

In the drawings, Figure 1 is an end view of a valve-stem and contiguous mechanism. Fig. 2 is a longitudinal section of the parts shown in Fig. 1. Fig. 3 is a top view of the devices which regulate the point of cut-off. Fig. 4 is a section of the same, and Fig. 5 is a detail.

In the several figures, 1 is the valve-stem.

2 is the bearing bolted to the steam-cylinder, which supports the valve-stem.

3 is an arm, keyed to the end of the valve-stem by a key, 4.

5 is a collar mounted loosely on the valve-stem between the bearing 2 and the hub of arm 3.

6 is an arm on collar 5.

7 is a pin on arm 6, and 8 is a link connecting pin 7 with a moving part of the engine—such as the ordinary wrist-plate of a Corliss engine—so that the collar 5 is oscillated back and forth thereby.

9 is another arm on collar 5, projecting from it in the general direction of arm 3.

10 is a pin on the arm 9. At one limit of the oscillation of arm 9 pin 10 engages a latch, 11, which is pivoted at 12 to arm 3. The arm 3 and the valve-stem with it is thus oscillated in one direction by arm 9 through a part or the whole of the stroke of the latter, according to when the latch is tripped. The valve is opened by this motion.

13 is a spring to press the latch 11 inward.

14 is a link connecting a pin, 15, on arm 3 with the dash-pot.

16 is a pin arranged in a groove or hole in arm 3, with one end against latch 11 and the other end against a bent lever, 17, which is pivoted at 18 to the arm 3. The bent lever is also connected to a spline, 19, which is capable of sliding in a groove in the valve stem 1.

20 is a collar loosely fitted on the valve stem 1 and attached to spline 19, so that when the collar slides on the valve-stem the spline moves with it.

21 is a bent lever pivoted at 22, and having one end forked to embrace collar 20, to which it is pivoted, as indicated by the dotted lines in Fig. 1. The other end of lever 21 extends into the casing 23 in position to be operated on by a pin, 24, on a revolving disk, 25. This disk 25 is keyed to the upper end of a shaft, 26, the other end of which has keyed to it a pinion, 27, as shown in Fig. 4. In line with shaft 26 is another shaft, 28, to the end of which is keyed a hollow wheel or casing, 29. This wheel has an interior spoke or web, which carries a bearing, 30, in which a pin or arbor, 31, is mounted, so as to turn freely therein. On one end of the pin 31 is a gear, 32, which meshes with pinion 27. On the other end of the pin is a pinion, 33, which meshes with a gear, 34, placed loosely on shaft 28 within the wheel 29. Connected to the gear 34 is an arm, 35, the end of which is connected by a link, 36, to the governor.

The operation of this apparatus is as follows: The shaft 28 is revolved by the engine at the same speed as its main shaft, and of course wheel 29 turns with it and carries pin 31 with it. Gear 34 being stationary, pinion 33 is rolled around it, and by means of pin 31 causes gear 32 to revolve. This gives pinion 27 and shaft 26 a revolution in the contrary direction to that of shaft 28. Shaft 26 by its revolution turns disk 25, which is keyed to it, and brings pin 24 in contact with lever 21 once during each revolution, and thereby operates the lever, slides collar 20 and spline 19 with it, and thereby, through lever 17, causes pin 16 to trip latch 11 and release arm 3, which immediately closes the valve. The point of the stroke at which this closing of the valve takes place is of course dependent on the time at which pin 24 strikes lever 21, and this is varied by the governor operating through link 36 and arm 35 to change the position of gear 34. Shaft 26 should be so geared as to make one revolution to each revolution of shaft 28. This may of course be done by various proportions of gears. I have found a convenient proportion for the gears to be, forty teeth on gear 34, thirty teeth on pinion 33, forty-two teeth on gear 32, and twenty-eight teeth on pinion 27.

I have not thought it necessary to show all of the connections of this mechanism with the engine, as doing so would simply complicate the drawings and render the specification unnecessarily prolix. The mechanic familiar with the ordinary types of Corliss engines and valve-gear will have no difficulty in applying my mechanism to them, nor in applying it to other engines to which it may be applicable.

What I claim is—

1. The sun-and-planet gears for tripping the latch and releasing the valve, the stationary gear of which has its position changed by the governor to vary the point at which the latch is tripped, substantially as set forth.

2. The combination, substantially as set forth, of the wheel 29, moving with the engine, the gears 32 and 33, carried by said wheel, the gear 34, acted upon by the governor, and the gear 27, connected with a tripping device for tripping a latch and releasing the valve.

3. The combination, substantially as set forth, of the valve-stem, the arm 3 thereon, connected to the dash-pot and carrying a latch, the collar 5, oscillated by the engine and engaging said latch to open the valve, and the sun-and-planet mechanism for tripping the latch and releasing the valve.

4. The combination, substantially as set forth, of the valve-stem, the arm 3 thereon, the latch pivoted to said arm, the spline 19, the bent lever and pin for tripping the latch operated by said spline, and mechanism for moving the spline to trip the latch and release the valve at the desired point of cut-off.

5. The combination, substantially as set forth, of the sun-and-planet gears, and the cam or pin 24, operated thereby and acting to trip a latch and release the valve at the desired point of cut-off.

6. The combination, substantially as set forth, of the latch, the pin 16, for tripping the latch, the spline 19, the levers connecting the spline with the pin, collar 20, connected to the spline, the cam or pin 24, and the lever operated by said pin and acting to move the spline and trip the latch.

HARVEY F. GASKILL.

Witnesses:
WILLARD T. SEARS,
A. L. DAVISON.